United States Patent Office 2,762,796
Patented Sept. 11, 1956

2,762,796

IMINODIBENZYL DERIVATIVE

Charles J. Morel, Arlesheim, Basel Land, and Franz Hafliger, Basel, Switzerland, assignors to J. R. Geigy A.-G., Basel, Switzerland, a Swiss firm No Drawing. Application November 24, 1954,
Serial No. 471,088

Claims priority, application Switzerland
November 26, 1953

1 Claim. (Cl. 260—239)

The present invention is concerned with a new derivative of iminodibenzyl which has an anti-epileptic activity, as well as with the process for the production thereof.

It has been found that N-carbamyl-iminodibenzyl, (5-carbamyl-10.11-dihydro-5-dibenz(b.f)azepine) of the formula:

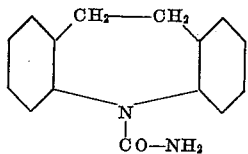

has a strong anti-convulsive activity and is suitable for use as an anti-epileptic agent. The new compound can be produced from iminodibenzyl by several of the known methods for the production of asymmetrically di-substituted ureas.

A simple process for the production of N-carbamyl-iminodibenzyl consists in reacting phosgene with imino-dibenzyl and reacting the N-chlorocarbonyl-iminodiben-zyl obtained with ammonia. Both reactions are performed with advantage in inert organic solvents at a raised temperature.

Also a chloroformic acid ester having an alcohol or phenol component which can be easily split off such as, e. g. chloroformic acid phenyl ester, can be reacted with iminodibenzyl instead of phosgene and the carbonic acid amide esters so obtained are then reacted with ammonia.

By reacting a cyanogen halide, in particular a cyanogen bromide, with iminodibenzyl or alkali compounds thereof, N-cyano-iminodibenzyl can be obtained and this can be converted into N-carbamyl-iminodibenzyl by partial hydrolysis.

The following example illustrates the production of the new compound. Parts are given as parts by weight and the relationship of parts by weight to parts by volume is as that of grammes to cubic centimetres. The temperatures are in degrees centigrade.

Example 40 parts of iminodibenzyl are dissolved in 250 parts by volume of abs. toluene and boiled under reflux while stirring. A slow stream of phosgene is introduced over a period of 3 hours. After cooling, the excess phosgene is removed by passing a stream of dry air through and after cooling well, the N-chlorocarbonyl-iminodibenzyl which crystallises out is drawn off under suction. It melts at 122°. 43 parts of this compound with 100 parts by volume of 8.5% alcoholic ammonia solution are heated to 90°–100° in the autoclave for 10 hours. After cooling, the precipitated N-carbamyl-iminodibenzyl is drawn off under suction and recrystallised from alcohol with the addition of a little animal charcoal. It melts at 210°.

The new compound may be made into pharmaceutical compositions, in particular tablets, by admixture thereof with suitable and compatible pharmaceutical carriers, e. g. corn starch, lactose, stearic acid, talc etc.

What we claim is:
N-carbamyl-iminodibenzyl.

No references cited.